(12) United States Patent  (10) Patent No.: US 6,563,418 B1
Moon  (45) Date of Patent: May 13, 2003

(54) AUTOMOTIVE NETWORK AND ADAPTER

(75) Inventor: Billy G. Moon, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 2 days.

(21) Appl. No.: 09/733,663

(22) Filed: Dec. 8, 2000

(51) Int. Cl.[7] .............................................. H04M 11/04
(52) U.S. Cl. ................................................ 340/310.01
(58) Field of Search ....................... 340/310.01, 310.06, 340/468, 472, 474; 701/36, 355

(56) References Cited

U.S. PATENT DOCUMENTS 6,188,939 B1 * 2/2001 Morgan et al. ............... 701/36

* cited by examiner

Primary Examiner—Daryl Pope
(74) Attorney, Agent, or Firm—Baker Botts L.L.P.

(57) ABSTRACT

A method for communicating data to and from a direct current local area network (DC LAN) in an automobile includes receiving data from a first device that is coupled to the DC LAN. The data received from the first device has a first data format associated with a first lower level communication protocol that is appropriate for the DC LAN. The method also includes determining that a destination address included in the data identifies a second device in the automobile. The second device does not use the first lower level communication protocol for communication of data. The method further includes converting the data to a second data format associated with a second lower level communication protocol that is appropriate for the second device. In addition, the method includes communicating the data in the second data format to the second device using the second lower level communication protocol.

30 Claims, 1 Drawing Sheet

AUTOMOTIVE NETWORK AND ADAPTER

TECHNICAL FIELD OF THE INVENTION

This invention relates to the field of networking, and more particularly to an automotive network and adapter.

BACKGROUND OF THE INVENTION

Due to the increasing mobility of our society and the constant desire for access to data and for communication with others, communication networks are beginning to be implemented in automobiles. Such networks allow various devices in an automobile to be networked. One or more of these devices may be wireless communication interfaces that allow a user to communicate with distant users or to obtain data from the Internet while traveling in an automobile. One challenge in the implementation of an automotive network is to limit the additional wiring that is needed to implement the network and to couple devices to the network, since such wiring may be expensive or difficult to install during manufacturing of an automobile or as an "after-market" addition. Furthermore, such wiring adds weight to an automobile and reduces the fuel economy of the automobile.

SUMMARY OF THE INVENTION

According to the present invention, disadvantages and problems associated with previous automotive networks have been substantially reduced or eliminated.

According to one embodiment of the present invention, a method for communicating data to and from a direct current local area network (DC LAN) in an automobile includes receiving data from a first device that is coupled to the DC LAN. The data received from the first device has a first data format associated with a first lower level communication protocol that is appropriate for the DC LAN. The method also includes determining that a destination address included in the data identifies a second device in the automobile. The second device does not use the first lower level communication protocol for communication of data. The method further includes converting the data to a second data format associated with a second lower level communication protocol that is appropriate for the second device. In addition, the method includes communicating the data in the second data format to the second device using the second lower level communication protocol.

The various embodiments of the present invention provide a number of important technical advantages. For example, embodiments of the present invention include an automotive network that uses the existing electrical wiring in an automobile to implement a direct current local area network (DC LAN) in the automobile. Devices compatible with the DC LAN may be directly coupled to the DC LAN. For example, a router may be coupled to the DC LAN to provide a user with access to other networks, including wireless local and wide area networks accessed using appropriate wireless network interfaces. The use of such a DC LAN reduces the wiring required to network devices in an automobile and greatly reduces the effort and expense required to create such a network.

Furthermore, embodiments of the present invention also provide a network adapter that enables devices that are not compatible with the DC LAN to be coupled or "bridged" to the DC LAN. For example, a network adapter incorporating teachings of the present invention may be used to couple a computer having an Ethernet network card to the DC LAN or to couple a Bluetooth device to the DC LAN. Such a network adapter may be configured to connect with the DC LAN using an existing cigarette lighter receptacle (or similar electrical outlet) in the automobile. Therefore, the network adapter allows a user to easily access an automotive DC LAN without having to install additional access points to the network. Furthermore, the network adapter may be constructed so that it may be easily moved from one automobile to another. Other important technical advantages are readily apparent to those skilled in the art from the following figures, descriptions and claims.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE INVENTION

Figure 1:
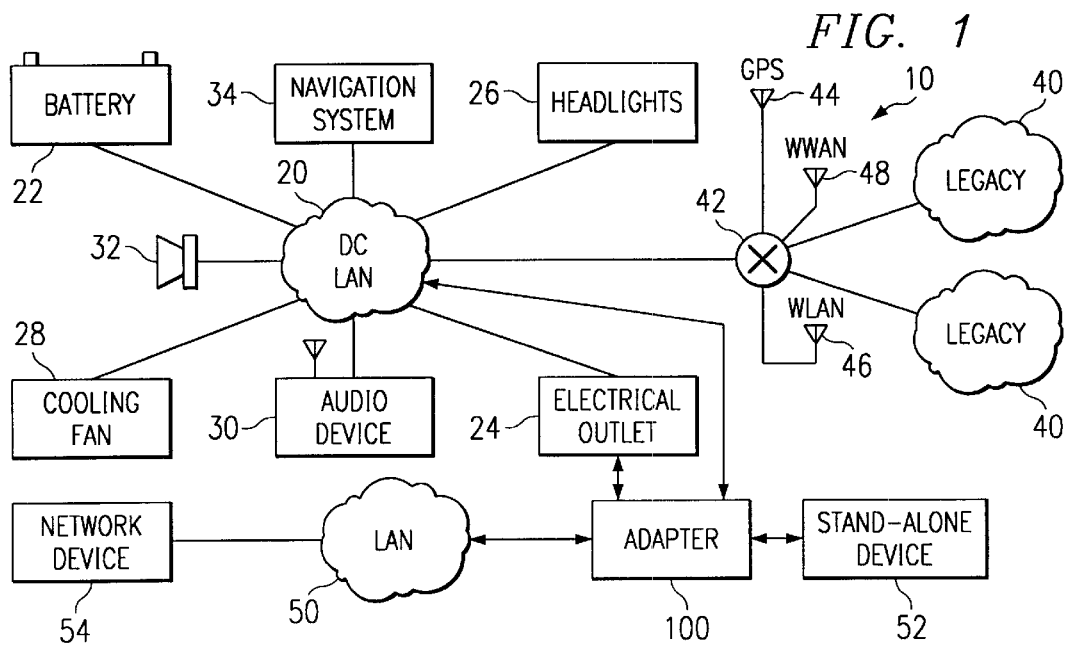
FIG. 1 illustrates an exemplary automotive system constructed in accordance with the present invention.

FIG. 1 illustrates an exemplary automotive system 10 constructed in accordance with the present invention. System 10 includes various networks that may be included in an automobile or other vehicle. These networks include a direct current local area network (DC LAN) 20, one or more legacy networks 40 (for example, an airbag control system or an engine control system) coupled to DC LAN 20 using a router 42, and one or more LANs 50 and/or stand-alone device 52 coupled to DC LAN 20 using a DC network adapter 100. DC LAN 20 may be a DC power-line network that uses the existing electrical wiring in an automobile to communicate data between devices coupled to DC LAN 20. Therefore, DC LAN 20 is used both to conduct DC current to one or more devices coupled to DC LAN 20 and to communicate data between one or more of these devices (thus a device may receive current and/or data using DC LAN 20). The term "DC LAN" is used to encompass both the electrical power and data communication aspects of the DC wiring in an automobile.

A battery 22 (typically a twelve volt (12 V) battery) is coupled to DC LAN 20 to provide power to one or more devices coupled to DC LAN 20. Battery 22 is typically recharged using an alternator. One or more electrical outlets 24, such as cigarette lighter outlets or similar electrical interfaces, are also coupled to DC LAN 20 to provide access to the power provided by battery 22. Numerous other devices may be coupled to DC LAN 20 for its electrical and/or data communication features. For example, headlights 26 or a cooling fan 28 may be coupled to DC LAN 20 only to receive electrical power from battery 22. Furthermore, an audio entertainment device 30, such as a radio or a CD player, may use DC LAN 20 to receive power from battery 22 and to communicate audio data to one or more speakers 32. Therefore, if speakers 32 have the capability of receiving and processing digital audio signals, the need for separate speaker wiring may be eliminated. Similarly, a navigation system 34 may be coupled to DC LAN 20 to receive power from battery 22. Navigation system 34 may also receive data from other devices directly coupled to DC LAN 20 or from devices coupled to DC LAN 20 using router 50. For example, a GPS antenna/receiver 44 may communicate automobile location information to navigation system 34 for display to a user.

Devices coupled to DC LAN 20 may also communicate with legacy networks 40 or with one or more wireless networks using router 42. Communications with wireless networks may be enabled using one or more wireless network interfaces, such as a wireless LAN (WLAN) interface 46 or a wireless wide area network (WWAN) interface 48. For example, WLAN interface 46 may include an antenna and transceiver operable to communicate data to and from any appropriate type of WLAN (such as a WLAN based on the IEEE 802.11 standard) or any appropriate wireless stand-alone devices (such as Bluetooth-enabled devices). WWAN interface 48 may include an antenna and transceiver operable to communicate data to and from any appropriate type of WWAN, including various cellular telephone networks.

As is described below, adapter 100 may be used to couple one or more LANs 50 and/or stand-alone devices 52 to DC LAN 20, thus allowing stand-alone devices 52 or one or more devices 54 coupled to LAN 50 to communicate with devices coupled to DC LAN 20 (including devices and networks coupled to router 42). For example, a laptop computer may be coupled to DC LAN 20 using adapter 100 to allow the computer to access the Internet using WWAN interface 48. Adapter 100 is used to couple LAN 50 or stand-alone device 52 to DC LAN 20 when LAN 50 or stand-alone device 52 uses a different communication protocol than DC LAN 20. Therefore, adapter 100 performs the function of a translation bridge by coupling devices using two different communication protocols and performing the necessary data conversion (such as address conversion) and forwarding to allow such devices to communicate data between one another.

For example, the laptop computer described above may include an Ethernet card to enable the computer to communicate with other Ethernet devices. However, since DC LAN 20 may not be an Ethernet network, adapter 100 may be used to communicate data from a DC LAN device to the Ethernet network interface card (NIC) of the computer. In such a case, adapter 100 receives a frame from the DC LAN device that includes both the data to be communicated to the laptop computer and a destination address to which the data is to be delivered. The term "frame" will be used to refer to any packetized unit of data that includes any appropriate type of data to be communicated from one device to another (which will be referred to as "payload data") and an address to which the data is to be communicated. Since the format of the DC LAN frame received by adapter 100 is typically not the same format as an Ethernet frame, adapter 100 converts the frame to the correct format for communication to the laptop computer. For example, adapter 100 may process and remove the DC LAN header (which includes the destination address information), determine the appropriate Ethernet header to add to the payload data based on the DC LAN header, add the appropriate Ethernet header to the payload data to create an Ethernet frame, and communicate the Ethernet frame to the Ethernet NIC of the laptop computer. It should be noted that DC LAN 20 and LAN 50 (or stand-alone device 52) may use the same upper layer communication protocol (such as the Internet Protocol). However, translation at lower network layers, such as the physical and data link layers, may need to be performed (for example, between Ethernet and the DC LAN protocol). Communication protocols operating below the "network layer" of the Open System Interconnection (OSI) model and similar protocols will be referred to as "lower layer communication protocols."

Figure 2:
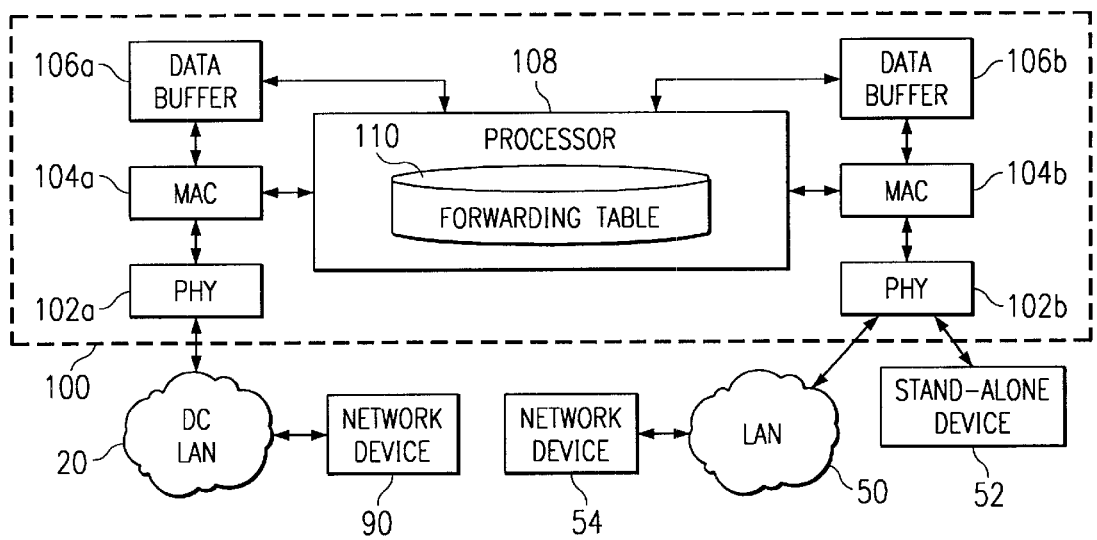
FIG. 2 illustrates the functional components of an exemplary direct current (DC) network adapter.

FIG. 2 illustrates the functional components of an exemplary DC network adapter 100. As described above, adapter 100 is used to couple a DC LAN device 90 to a stand-alone device 52 or one or more network devices 54 coupled to LAN 50. DC LAN device 90 may include any of the DC LAN devices described above (including router 42) or any other devices that may be coupled to DC LAN 20. Furthermore, stand-alone device 52 and network device 54 may both be the same type of device, with the device being connected to adapter 100 using different techniques. For example, both device 52 and 54 may be a computer including an Ethernet NIC. In this case, stand-alone device 52 may be a computer having its Ethernet NIC coupled directly to adapter 100 (with no other devices sharing a connection to adapter 100). Similarly, network device 54 in this case may be a computer having its Ethernet NIC coupled to an Ethernet LAN 50 that is coupled to adapter 100. Thus, other network devices 54 may be coupled to adapter 100 using a common connection.

Adapter 100 includes a physical interface module 102 (which may be referred to as a "PHY") that allows adapter 100 to be coupled to and receive data from a physical medium (including a wireless medium) over which the data is communicated. In the exemplary embodiment, adapter 100 includes a PHY 102a that enables adapter 100 to be coupled to and communicate data with DC LAN 20 and a PHY 102b that that enables adapter 100 to be coupled to and communicate data with LAN 50 or a medium connecting stand-alone device 52 to adapter 100. PHY 102a may be coupled to DC LAN 20 through the use of electrical outlet 24, through direct wiring into DC LAN 20 (for example, through a connection to a wiring bus), or using any other appropriate method. PHY 102b may be coupled to LAN 50 or stand-alone device 52 using any appropriate wireline or wireless connection. PHYs 102 may be implemented as any appropriate combination of hardware and/or software capable of communicating data between networks or stand-alone devices that are coupled to adapter 100 and a media access control (MAC) module 104 (which may be referred to as a "MAC") for further processing.

Any suitable type of PHY 102b may be used to receive data from and transmit data to any appropriate stand-alone device 52 or LAN device 54. As an example only and not by way of limitation, PHY 102b may include the appropriate physical interface (and any associated circuitry) for communication with devices 52 or 54 using any of the following lower level protocols: Ethernet (10 BaseT, 100 BaseT, Gigabit, or any other form of Ethernet), Token Ring, Fiber-Distributed Data Interface (FDDI), Universal Serial Bus (USB), Bluetooth, Infrared Data Association (IrDA), IEEE 802.11 (or other WLAN protocols), IEEE 1394 (sometimes referred to as "FireWire"), RS-232 (or other serial port protocols), or IEEE 1284 (or other parallel port protocols). Furthermore, although adapter 100 is illustrated as including two PHYs 102a and 102b and two associated MACs 104a and 104b, it should be understood that adapter 100 may have as many PHYs 102 and MACs 104 as appropriate.

As a device coupled to DC LAN 20, adapter 100 receives all the frames communicated over DC LAN 20. Adapter 100 determines whether each frame should be forwarded to LAN 50 or stand-alone device 52 or whether the frame should be ignored. In operation, PHY 102a receives data communicated from device 90 over DC LAN 20 in the form of a DC electrical signal (typically 12 V direct current). Any appropriate technique may be used to communicate data using the electrical wiring of an automobile and to separate the data signals from the electrical current providing DC power to devices connected to the electrical wiring. Furthermore, PHY 102a may include any appropriate components for differentiating the data signals from the electrical current used to provide power (for example using a high-pass filter to filter out low frequency electrical current).

Furthermore, PHY 102a may perform any manipulation of the electrical format of the data that is appropriate for further processing by other components of adapter 100. As an example only, PHY 102a may convert the 12 V direct current received from DC LAN 20 to 5 V direct current used by components of adapter 100. PHY 102a then communicates the data (represented using the manipulated electrical signals) to MAC 104. While PHY 102a simply receives and passes on (after any appropriate electrical manipulation) electrical signals without determining any data formatting or content, MAC 104a is able to interpret the data (bits) encoded in the electrical signals to reassemble the frames of data communicated from device 90. MACs 104 may be implemented as any appropriate combination of hardware and/or software for performing this function (or any other appropriate functions).

When MAC 104a has reassembled the frame, MAC 104a determines what data in the frame is header data or other control information and what data is payload data. MAC 104a may then remove the header data (including the destination address information) and communicate the payload data to a data buffer 106a. MAC 104a may also communicate the source and destination address information to a processor 108 (or the address information may be communicated with the payload data to data buffer 106a). It should be noted that in some cases the destination address information may be included or encapsulated in the payload data, in which case this information may be removed from the payload data. Furthermore, MACs 104 may use any other appropriate technique for identifying the payload data (the information that device 90 is attempting to convey to device 52 or 54) and the address information in an incoming frame and for forwarding the payload data and/or the address information to processor 108 for further processing. MACs 104 may also perform logical link control (LLC) processing if appropriate (or such processing may be performed by processor 108).

Processor 108 receives the payload data and determines the destination address associated with the payload data. Processor 108 uses a forwarding table 110 that includes the addresses (for example, MAC addresses) of devices 52, 54, and 90 to determine whether the destination device is coupled to DC LAN 20 or whether it is coupled to LAN 50 (or directly to PHY 102b, as with stand-alone device 52). If the destination device is a DC LAN device 90, then processor 108 does not forward the payload data and may simply discard the data. If the destination device is a device 52 or 54, then processor forwards the payload data to data buffer 106b and forwards the destination address information to MAC 104b (or the address information may be communicated with the payload data to data buffer 106b). MAC 104b constructs a frame, having a format appropriate for communication to LAN 50 or stand-alone device 52, that includes the destination address information and the payload data. MAC 104b communicates the frame to PHY 102b, which performs any appropriate electrical format conversion and communicates the frame to LAN 50 or stand-alone device 52. For example, PHY 102b may convert the 5 V DC electrical signal (or any other electrical format used by adapter 100) to a different electrical format or to a radio frequency (RF) format for communication to a wireless LAN 50 or stand-alone device 52.

Although the communication of data described above is from PHY 102a to PHY 102b, it should be understood that a similar process may be used to communicate data from PHY 102b to PHY 102a. Furthermore, although a particular technique and components for communicating data between DC LAN 20 and LAN 50 or stand-alone device 52 is described above, adapter 100 may use any other appropriate technique and include any other appropriate components for communication of data between DC LAN 20 and a LAN 50 (or stand-alone device 52) that uses a different lower level communication protocol than DC LAN 20.

Figure 3:
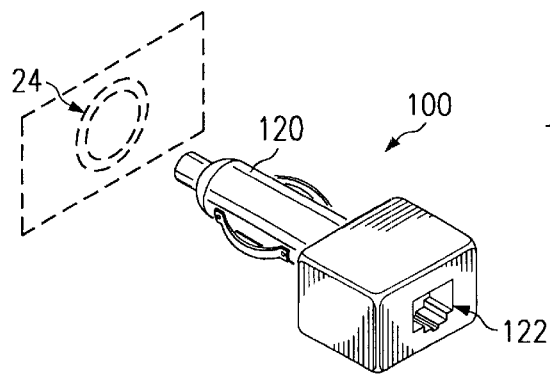
FIG. 3 illustrates an exemplary external configuration of a DC network adapter that is configured for connection to an electrical outlet of a DC network.

FIG. 3 illustrates an exemplary external configuration of a DC network adapter 100 configured for connection to an electrical outlet 24 of DC LAN 20. The typical electrical outlet 24 included in the electrical wiring of an automobile is a cigarette lighter jack or outlet. The cigarette lighter jack is a 12 V outlet in which a cigarette lighter may be inserted for heating (although many automobiles are now being produced with only the 12 V electrical outlet and not the associated cigarette lighter). Many devices, such as radar detectors and cellular phones, are configured to receive electrical power from outlet 24 using a power adapter that includes a cigarette lighter plug on one end for insertion into outlet 24 and another appropriate electrical plug (such as a "mini" plug or a coaxial plug) on the other end for insertion into the device to be powered.

Adapter 100 includes a similar cigarette lighter plug 120 that may be inserted into outlet 24 to receive data communicated over DC LAN 20 (and, optionally, electrical power). Plug 120 is an example of the physical interface included in PHY 102a. Unlike a traditional power adapter, network adapter 100 includes a data communication interface 122. Data communication interface 122 is an example of the physical interface included in PHY 102b. Although interface 122 is illustrated as an RJ-45 jack (typically used for 10 BaseT Ethernet connections), interface 122 may include any other appropriate interface for coupling adapter 100 to a LAN 50 or stand-alone device 52 (including an RF interface for wireless devices, such as a 2.4 Gigahertz antenna and transceiver for communicating with a Bluetooth device). As is described above, plug 120 and interface 122 are coupled through the other components of adapter 100 (such as MACs 104 and processor 108) to allow data to be received in one format at plug 120 and to be communicated from interface 122 in another format (or received at interface 122 and communicated from plug 120). Furthermore, although plug 120 is illustrated, adapter may be coupled to DC LAN 20 by wiring adapter 100 into the electrical wiring of an automobile or using any other suitable connection. However, the use of plug 120 provides the advantage of making adapter 120 easily removable and portable (for example, so that adapter 120 may be moved easily from one automobile to another).

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method for communicating data to and from a direct current local area network (DC LAN) in an automobile, comprising:

receiving data from a first device coupled to the DC LAN, the data having a first data format associated with a first lower level communication protocol appropriate for the DC LAN;

determining that a destination address included in the data identifies a second device in the automobile, the second device not using the first lower level communication protocol for communication of data;

converting the data to a second data format associated with a second lower level communication protocol appropriate for the second device; and communicating the data in the second data format to the second device using the second lower level communication protocol.

2. The method of claim 1, further comprising converting the electrical format of the data to an electrical format appropriate for communication to the second device.

3. The method of claim 1, further comprising:

receiving second data from the second device, the second data having the second data format;

determining that a destination address included in the second data identifies the first device;

converting the second data to the first data format for communication to the first device; and communicating the second data in the first data format to the first device using the first lower level communication protocol.

4. The method of claim 1, further comprising:

receiving second data from the first device, the second data having the first data format;

determining that a destination address included in the second data identifies a third device coupled to the DC LAN, the third device using the first data format for communication of data; and discarding the second data.

5. The method of claim 1, wherein:

the DC LAN comprises an electrical outlet; and the data is received from the first device using a plug inserted into the electrical outlet.

6. The method of claim 5, wherein:

the electrical outlet comprises a cigarette lighter receptacle; and the plug comprises a cigarette lighter plug.

7. The method of claim 1, wherein the data is communicated to the second device using a wireline communication interface.

8. The method of claim 1, wherein the data is communicated to the second device using a wireless communication interface.

9. A network adapter for an automotive direct current local area network (DC LAN), comprising:

a first physical interface module (PHY) operable to receive data from a first device coupled to the DC LAN, the data having a first electrical format appropriate for communication using the DC LAN, the first PHY further operable to convert the data to a second electrical format appropriate for the network adapter;

a first media access control module (MAC) operable to receive the data in a first data format from the first PHY and to identify a destination address to which the data is to be communicated;

a processor operable to determine whether the destination address identifies a second device coupled to the first PHY or a third device coupled to a second PHY of the network adapter, the processor further operable to communicate the data to a second MAC of the network adapter if the destination address identifies the third device;

the second MAC operable to receive the data, convert the destination address and data to a second data format appropriate for communication to the third device, and communicate the data to the second PHY; and the second PHY operable to receive the data, convert the data into a third electrical format or a radio frequency (RF) format appropriate for communication to the third device, and communicate the data to the third device.

10. The network adapter of claim 9, wherein:

the DC LAN comprises an electrical outlet; and the first PHY comprises a physical interface configured to couple with the electrical outlet.

11. The network adapter of claim 10, wherein the physical interface comprises a cigarette lighter plug.

12. The network adapter of claim 9, wherein the first electrical format comprises 12 V direct current.

13. The network adapter of claim 9, wherein the first data format comprises a DC LAN frame.

14. The network adapter of claim 9, wherein the third device comprises a stand-alone device directly coupled to the second PHY.

15. The network adapter of claim 9, wherein the third device comprises a network device coupled to the second PHY using a LAN.

16. The network adapter of claim 9, wherein the second PHY comprises a wireline communication interface.

17. The network adapter of claim 9, wherein the second PHY comprises a wireless communication interface.

18. A network adapter, comprising:

a first interface operable to receive data from a direct current local area network (DC LAN) in an automobile, the DC LAN using a first lower level communication protocol; and a second interface coupled to the first interface and operable to communicate the data to a LAN or a stand-alone device, the LAN or stand-alone device using a second lower level communication protocol not appropriate for the DC LAN.

19. The network adapter of claim 18, wherein:

the DC LAN comprises an electrical outlet; and the first interface is configured to couple with the electrical outlet.

20. The network adapter of claim 19, wherein the first interface comprises a cigarette lighter plug.

21. The network adapter of claim 18, wherein the second interface comprises a wireline communication interface.

22. The network adapter of claim 18, wherein the second interface comprises a wireless communication interface.

23. An automotive network, comprising:

a direct current local area network (DC LAN) implemented using a twelve volt (12 V) electrical wiring system in an automobile;

a first device coupled to the DC LAN and operable to communicate data using a first lower level communication protocol appropriate for the DC LAN;

a second device operable to communicate data using a second lower level communication protocol not appropriate for the DC LAN; and a network adapter coupling the second device and the DC LAN, the network adapter comprising:

a first interface operable to receive data from the first device using the DC LAN; and a second interface coupled to the first interface and operable to communicate the data to the second device using the second lower level communication protocol.

24. The automotive network of claim 23, wherein:

the first device comprises a router; and the automotive network further comprises a wireless wide area network (WWAN) interface coupled to the router, the network adapter enabling the second device to communicate with the WWAN interface.

25. The automotive network of claim 24, wherein the WWAN interface comprises a cellular telephone network interface.

26. The automotive network of claim 23, wherein:

the DC LAN comprises an electrical outlet; and the first interface of the network adapter is configured to couple with the electrical outlet.

27. The automotive network of claim 26, wherein the first interface of the network adapter comprises a cigarette lighter plug.

28. The automotive network of claim 23, wherein the second interface of the network adapter comprises a wireline communication interface.

29. The automotive network of claim 23, wherein the second interface of the network adapter comprises a wireless communication interface.

30. A network adapter for communicating data to and from a direct current local area network (DC LAN) in an automobile, comprising:

means for receiving data from a first device coupled to the DC LAN, the data having a first data format associated with a first lower level communication protocol appropriate for the DC LAN;

means for determining that a destination address included in the data identifies a second device in the automobile, the second device not using the first lower level communication protocol for communication of data;

means for converting the data to a second data format associated with a second lower level communication protocol appropriate for the second device; and means for communicating the data in the second data format to the second device using the second lower level communication protocol.

* * * * *